(12) United States Patent
Yamamoto et al.

(10) Patent No.: US 7,562,286 B2
(45) Date of Patent: Jul. 14, 2009

(54) APPARATUS, SYSTEM, METHOD AND COMPUTER PROGRAM PRODUCT FOR DOCUMENT MANAGEMENT

(75) Inventors: Yohei Yamamoto, Kawasaki (JP); Katsumi Kanasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 247 days.

(21) Appl. No.: 10/386,455

(22) Filed: Mar. 13, 2003

(65) Prior Publication Data
US 2003/0182262 A1 Sep. 25, 2003

(30) Foreign Application Priority Data
Mar. 14, 2002 (JP) ............... 2002-069545

(51) Int. Cl.
*G06F 17/00* (2006.01)
(52) U.S. Cl. ..................... 715/200; 715/229
(58) Field of Classification Search ............... 707/500, 707/523, 501, 203; 715/500, 200, 229, 234
See application file for complete search history.

(56) References Cited

U.S. PATENT DOCUMENTS

| | | | |
|---|---|---|---|
| 6,253,217 B1 * | 6/2001 | Dourish et al. | 715/500 |
| 6,266,682 B1 * | 7/2001 | LaMarca et al. | 715/501.1 |
| 6,377,946 B1 * | 4/2002 | Okamoto et al. | 707/5 |
| 7,020,670 B1 * | 3/2006 | Andreoli et al. | 715/210 |
| 2002/0015186 A1 * | 2/2002 | Nagata | 358/1.18 |
| 2002/0078004 A1 * | 6/2002 | Ambrosini et al. | 707/1 |
| 2002/0184233 A1 * | 12/2002 | Schneider | 707/104.1 |
| 2003/0070144 A1 * | 4/2003 | Schnelle et al. | 715/513 |
| 2007/0043692 A1 * | 2/2007 | Oh et al. | 707/1 |

FOREIGN PATENT DOCUMENTS

| | | |
|---|---|---|
| JP | 11-161660 | 6/1999 |
| WO | WO 01/14948 A2 | 3/2001 |

OTHER PUBLICATIONS

NPL, Orcmid, DMA Object Model, May 23, 2001, DMA Technical Committee, DMA 1.0 Specification, pp. 1-2.*
Orcmid, DMA 1.0-7 Specifications, published May 23, 2001, pp. 1-34.*
Chuck Fay, The Document Management Alliance, 1998, Bulliten of the American Society for Information Science, pp. 20-24.*

(Continued)

*Primary Examiner*—Stephen S Hong
*Assistant Examiner*—Manglesh M Patel
(74) *Attorney, Agent, or Firm*—Dickstein Shapiro LLP

(57) ABSTRACT

A document management apparatus is configured to designate a desired document in a series of documents managed under a DMA document object model and to make a connection to a desired node in a hierarchical tree-structure of the desired document is provided. The document management apparatus includes an apparatus configured to accept a document call request for the desired document, that is made by a requesting device by presenting a document ID designating the desired document and specifying the desired node and to make connections to the specified nodes. The document ID includes a character string indicating a location of the desired document and character strings designating respective nodes in the hierarchical tree-structure of the desired document.

55 Claims, 11 Drawing Sheets

EXAMPLE OF OBJECT ID OMITTING VERSION DESIGNATION

OTHER PUBLICATIONS

"DMA Content Model" Internet Article, May 24, 2001; www.infunuovo.com/dma/dma1.0-7/content.htm; XP002271461.
"DMA Integration Model" Internet Article, May 24, 2001; www.infunuovo.com/dma/dma1.0-7/integration.htm; XP002271462.
Office Action dated Jul. 13, 2006 for European Patent Application No. 03 251 501.7.
Japanese Office Action issued by JPO on May 1, 2007 on JP Pat Appln. No. 2002-069545.
Japanese Specification Filed Nov. 28, 1997, Application No. HEI 09-327318, now JP-11-161660.
J-3100 Series/J3300 MIS-DOS Operation Manual V3.1, Japan, Toshiba Corporation, Mar. 30, 1990, pp. 65-73.

* cited by examiner

EXAMPLE OF OBJECT ID OMITTING VERSION DESIGNATION

EXAMPLE OF OBJECT ID OMITTING CONTENT ELEMENT DESIGNATION

APPARATUS, SYSTEM, METHOD AND COMPUTER PROGRAM PRODUCT FOR DOCUMENT MANAGEMENT

The present application claims priority and contains subject matter related to Japanese Patent Application No. 2002-069545 filed in the Japanese Patent Office on Mar. 14, 2002, and the entire contents of which are hereby incorporated by reference.

BACKGROUND OF THE INVENTION

1. Field of the Invention

The present invention relates to a document management apparatus, a document management system, a document management client apparatus, and a document management method.

2. Discussion of the Background

Today, electronic documents are widely used and are generalized. Concurrently with such wide use and generalization of electronic documents, electronic document management systems have drawn attention, and various products and standards for document management systems have been proposed. Such document management systems enable integrally managing, as one document, not only a document file itself, but also a plurality of versions, thumbnails and retrieval indexes thereof.

As a standard of electronic document management systems, the specification of the Document Management Alliance (DMA) is known. The primary object of the DMA is to develop an industry standard specification for document management systems. The DMA provides an API (Application Programming Interface) and a document model for unification of all document management systems. The DMA defines a document not as a simple file but as a more comprehensive model. The details of the DMA specification can be found at in DMA Technical Committee. DMA 1.0 Specification. AIIM International: Silver Spring, Md., 1998 and are known to one of ordinary skill in the art.

FIG. 1 is a block diagram illustrating an outline of the document structure of a document according to the document object model of the DMA. As illustrated in FIG. 1, according to the document object model of the DMA, one document 100 has a tree-structure constituted of a plurality of hierarchies. The root node 100 in the hierarchical tree-structure of a document corresponds to one document object, which is, in the example of FIG. 1, a report. The document object has properties, such as a title, an author, etc.

One document object is constituted of a plurality of versions 112, 114. Each version object 112, 114 has properties, e.g., a version number, a creation date, etc. In the example of FIG. 1, two versions exist, version 1.0 112 and version 2.0 114.

One version object is constituted of a plurality of renditions 116, 118. A rendition represents a rendering form of a document. For example, in a case of a document created by a word processor, in addition to a document file created by the word processor, a JPEG format image file for a thumbnail, a PDF format file, a text format file, etc. may be conceivable. Each document object includes a plurality of renditions as described above. However, always a primary rendition 116 exists. The primary rendition 116 is the one created as the original format of each document, and is the subject file for editing.

One rendition is constituted of a plurality of content elements 120, 124. A document is not necessarily constituted of one document file. For example, when a document includes a document file created by a word processor and a spreadsheet file created by a spreadsheet, respective files constitute content elements of the document, according to the DMA document object model.

FIG. 2 is a diagram illustrating a communication sequence between a client and a document management apparatus that uses the DMA specification (i.e., a DMA-compliant document management apparatus) when the client accesses the document management apparatus to call a content element of a desired document. FIG. 2 illustrates a case in which, for the document illustrated in FIG. 1, the top content element of the thumbnail rendition is called by the client.

First, the client calls the document object of the document (which is a report) using a document object ID. The document management apparatus connects the client to the document object of the report, and the document object of the report is returned to the client. Next, the client calls the version 2.0, the document management apparatus connects the client to the version 2.0, and the version 2.0 is returned to the client. Further, the client calls the thumbnail rendition, the document management apparatus connects the client to the thumbnail rendition, and the thumbnail rendition is returned to the client. Finally, the client calls the top content element at the lower level of the thumbnail rendition, the document management apparatus connects the client to the top content element, and the top content element is returned to the client.

In the currently available DMA API according to the DMA specification, each time a user accesses a document that uses the DMA document object model, the process described above with reference to FIG. 2 must be performed. This process is relatively complicated. This causes an application program for accessing the document that uses the DMA document object model to be relatively complicated.

Further, some document management systems do not support version and rendition information. In this case, the DMA API cannot be used.

Furthermore, according to the DMA specification, version, rendition and content element information must be specified. However, some clients might use a simpler document model. For example, a client might not manage version information in a system on the client side. In such a case, when the user accesses a document that uses the DMA specification, the client cannot designate a version of the document, so that the document cannot be accessed.

SUMMARY OF THE INVENTION

The present invention has been made in view of the above-discussed and other problems and addresses the above-discussed and other problems.

Preferred embodiments of the present invention allow simplification of an interface for accessing documents that use the DMA document object model.

The preferred embodiments of the present invention also allow a single API to be commonly used in a plurality of systems that use different document models.

Further, the preferred embodiments of the present invention enable accessing documents even when versions of the documents, etc. are not managed in respective systems on the client side.

According to a preferred embodiment of the present invention, a document management apparatus configured to designate a desired document in a series of documents managed under a DMA document object model, and to make a connection to a desired node in a hierarchical tree-structure of the desired document, is provided. The document management apparatus includes a document call request accepting device, configured to accept a document call request for the desired document that is made by a requesting device by presenting a document ID designating the desired document and specifying the desired node. The document ID includes a character string indicating a location of the desired document and character strings designating respective nodes, in the hierarchical tree-structure of the desired document. The document management apparatus further includes a connecting device configured to make connections to nodes, in the hierarchical tree-structure of the desired document, that are designated by the document ID, sequentially from an upper level one to a lower level one, and a returning device configured to obtain, when a connection to the desired node specified by the document ID has been made, predetermined information relating to the desired node, and to return the predetermined information relating to the desired node to the requesting device making the document call request.

The document management apparatus may be further configured such that the document call request accepting device accepts, together with the document ID, a request by a method that designates information to be returned by the returning device to the requesting device, and the returning device obtains, when the connection to the desired node specified by the document ID has been made, the information designated by the method to be returned by the returning device to the requesting device, and returns the information to the requesting device making the document call request.

In the document management apparatus described immediately above, the document call request accepting device may be configured to accept, as the request by a method, a request for a property of the desired node specified by the document ID. In this case, the returning device may be configured to obtain, when the request for the property of the desired node specified by the document ID has been accepted by the document call request accepting device, the property of the desired node specified by the document ID, and to return the property of the desired node specified by the document ID to the requesting device making the document call request. The document call request accepting device may also be configured to accept, as the request of the method, a request for a content element of the desired node specified by the document ID. In this case, the returning device may be configured to obtain, when the request for the content element of the desired node specified by the document ID has been accepted by the document call request accepting device, the content element of the desired node specified by the document ID, and to return the content element of the desired node specified by the document ID to the requesting device making the document call request. The returning device may be further configured to obtain, when the document ID accepted by the document call request accepting device omits designation of a content element in the hierarchical tree-structure of the desired document, all content elements at a lower level of a rendition designated by the document ID, and to return all the content elements at the lower level of the rendition designated by the document ID to the requesting device making the document call request.

The document management apparatus may be further configured such that the connecting device makes a connection to a latest version of the desired document designated by the document ID, when the document ID accepted by the document call request accepting device omits designation of a version in the hierarchical tree-structure of the desired document, a connection to a primary rendition at a lower level of a version of the desired document, that is designated by the document ID, when the document ID accepted by the document call request accepting device omits designation of a rendition in the hierarchical tree-structure of the desired document, or a connection to a top content element at a lower level of a rendition of the desired document, that is designated by the document ID, when the document ID accepted by the document call accepting device omits designation of a content element in the hierarchical tree-structure of the desired document.

Provided, according to another preferred embodiment of the present invention, is a client apparatus configured to access a document management apparatus, in which designation of a desired document in a series of documents managed under a DMA document object model and a connection to a desired node in a hierarchical tree-structure of the desired document are made. The client apparatus requests predetermined information relating to the desired node. The client apparatus includes a document call request making device configured to make a document call request to the document management apparatus by presenting a document ID designating the desired document and specifying the desired node. The document ID includes a character string indicating a location of the desired document and character strings designating nodes in the hierarchical tree-structure of the desired document. The client apparatus further includes a storage device configured to store an application program for making the document call request to the document management apparatus.

According to still another preferred embodiment of the present invention, a document management system including any of the above-described document management apparatuses and the above-described client apparatus is provided.

According to still another preferred embodiment of the present invention, a document management method for designating a desired document in a series of documents managed under a DMA document object model and for making a connection to a desired node in a hierarchical tree-structure of the desired document is provided. The method includes the steps of; accepting a document call request for the desired document, that is made by a client apparatus by presenting a document ID designating the desired document and specifying the desired node, the document ID including a character string indicating a location of the desired document and character strings designating nodes in the hierarchical tree-structure of the desired document; making connections to nodes, in the hierarchical tree-structure of the desired document, that are designated by the document ID, sequentially from an upper level one to a lower level one; and obtaining, when a connection to the desired node specified by the document ID has been made in the connections making step, predetermined information relating to the desired node specified by the document ID, and returning the predetermined information relating to the desired node to the client apparatus making the document call request.

In the above-described document management method, in the document call request accepting step, together with the document ID, a request of a method that designates information to be returned to the client apparatus may be accepted, and in this case, in the returning step, when the connection to the desired node specified by the document ID has been made in the connections making step, the information designated by the method may be obtained and be returned to the client apparatus making the document call request. Further, in the document call request accepting step, as the request by the method, a request for a property of the desired node specified by the document ID may be accepted, and in this case, in the returning step, when the request for the property of the desired node specified by the document ID has been accepted in the document call request accepting step, the property of the desired node specified by the document ID may be obtained and be returned to the client apparatus making the document call request. Furthermore, in the document call request accepting step, as the request by the method, a request for a content element of the desired node specified by the document ID may be accepted, and in this case, in the returning step, when the request for the content element of the desired node specified by the document ID has been accepted in the document call request accepting step, the content element of the desired node specified by the document ID may be obtained and be returned to the client apparatus making the document call request. In this case, further, in the returning step, when the document ID accepted in the document call request accepting step omits designation of a content element in the hierarchical tree-structure of the desired document, all content elements at a lower level of a rendition designated by the document ID may be obtained and be returned to the client apparatus making the document call request.

In any of the document management methods described above, in the connections making step, a connection to a latest version of the desired document designated by the document ID may be made when the document ID accepted in the document call request accepting step omits designation of a version in the hierarchical tree-structure of the desired document.

Further, in any of the document management methods described above, in the connections making step, a connection to a primary rendition at a lower level of a version of the desired document, that is designated by the document ID, may be made when the document ID accepted in the document call request accepting step omits designation of a rendition in the hierarchical tree-structure of the desired document.

Furthermore, in any of the document management methods described above, in the connections making step, a connection to a top content element at a lower level of a rendition of the desired document, that is designated by the document ID, may be made when the document ID accepted in the document call request accepting step omits designation of a content element in the hierarchical tree-structure of the desired document.

According to still another preferred embodiment of the present invention, a method of accessing a document management apparatus in which designation of a desired document in a series of documents managed under a DMA document object model and a connection to a desired node in a hierarchical tree-structure of the desired document are made to request predetermined information relating the desired node is provided. The method includes the steps of: making a document call request to the document management apparatus by presenting a document ID designating the desired document and specifying the desired node, the document ID including a character string indicating a location of the desired document and character strings designating nodes in the hierarchical tree-structure of the desired document; and storing an application program for making the document call request to the document management apparatus.

According to still another preferred embodiment of the present invention, a computer readable medium, storing computer program instructions which when executed by a computer perform a document managing operation of designating a desired document in a series of documents managed under a DMA document object model and making a connection to a desired node in a hierarchical tree-structure of the desired document, is provided. The document managing operation includes the steps of: accepting a document call request for the desired document, that is made by a client apparatus by presenting a document ID designating the desired document and specifying the desired node, the document ID including a character string indicating a location of the desired document and character strings designating nodes in the hierarchical tree-structure of the desired document; making connections to nodes in the hierarchical tree-structure of the desired document, that are designated by the document ID, sequentially from an upper level one to a lower level one; and obtaining, when a connection to the desired node specified by the document ID has been made in the connections making step, predetermined information relating to the desired node specified by the document ID, and returning the predetermined information relating to the desired node to the client apparatus making the document call request.

According to still another preferred embodiment of the present invention, a computer readable medium, storing computer program instructions which when executed by a computer performs an operation for accessing a document management apparatus in which designation of a desired document in a series of documents managed under a DMA document object model and a connection to a desired node in a hierarchical tree-structure of the desired document are made to request predetermined information relating the desired node, is provided. The accessing operation includes the steps of: making a document call request to the document management apparatus by presenting a document ID designating the desired document and specifying the desired node, the document ID including a character string indicating a location of the desired document and character strings designating nodes in the hierarchical tree-structure of the desired document; and storing an application program for making the document call request to the document management apparatus.

According to still another preferred embodiment of the present invention, a computer program product, directly loadable into an internal memory of a computer, is provided. The computer program includes computer program instructions which, when executed by the computer, perform the above-described document managing operation of designating a desired document in a series of documents managed under a DMA document object model and making a connection to a desired node in a hierarchical tree-structure of the desired document.

According to still another preferred embodiment of the present invention, a computer program product, directly loadable into an internal memory of a computer, is provided. The computer program product includes computer program instructions which, when executed by the computer, perform the above-described operation of accessing a document management apparatus in which designation of a desired document in a series of documents managed under a DMA document object model and a connection to a desired node in a hierarchical tree-structure of the desired document are made to request predetermined information relating the desired node.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompany drawings, wherein.

DETAILED DESCRIPTION OF THE PREFERRED EMBODIMENTS

Figure 1:
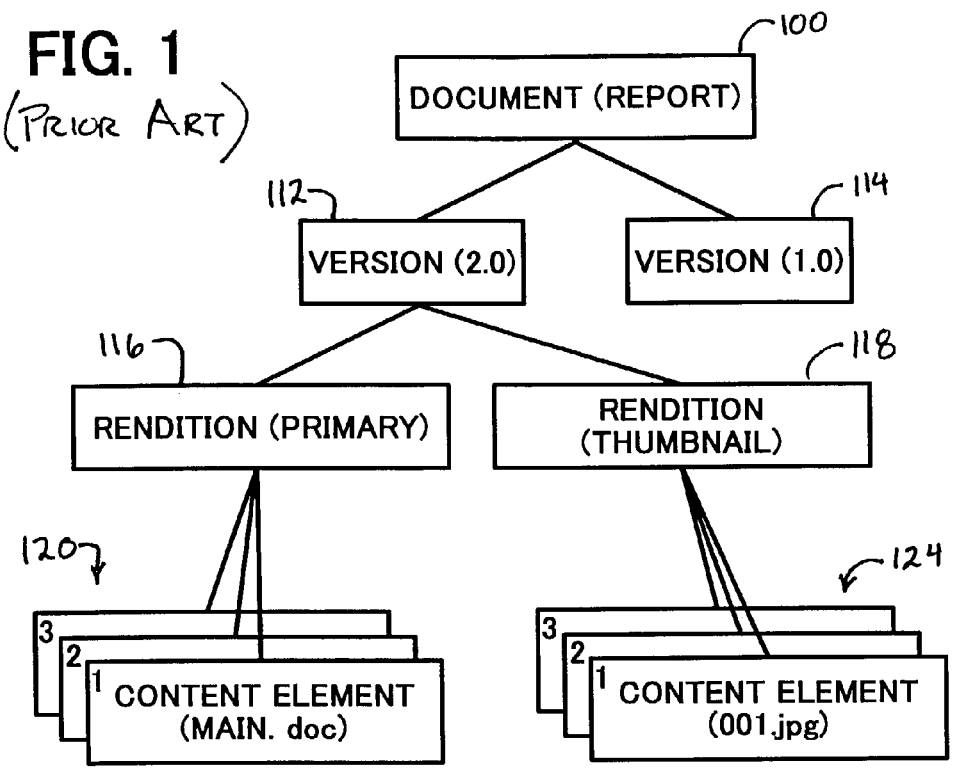
FIG. 1 is a block diagram illustrating an outline of a document structure according to the document object model of the DMA.

Referring now to the drawings, wherein like reference numerals designate identical or corresponding parts throughout the several views, preferred embodiments of the present invention are described.

Figure 3:
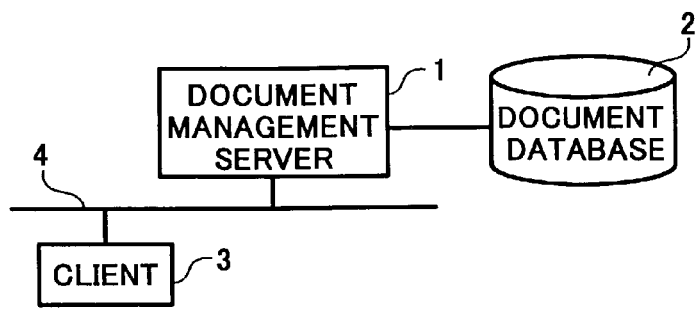
FIG. 3 is a block diagram illustrating a general construction of a document management system according to a preferred embodiment of the present invention.

FIG. 3 is a block diagram illustrating a general construction of a document management system according to a preferred embodiment of the present invention. A document management server 1 is a document management apparatus configured to manage documents that are registered in a document database 2 using the DMA document object model. A client 3 is a client apparatus configured to access the document management server 1 via a LAN 4.

Figure 4:
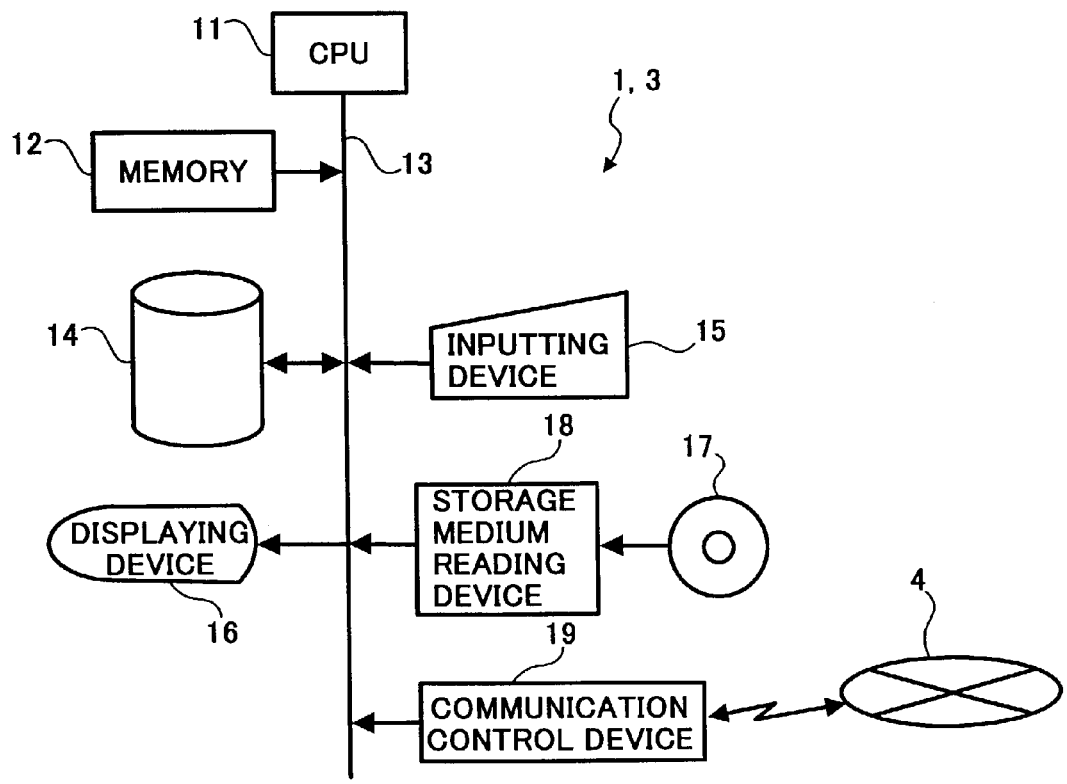
FIG. 4 is a block diagram illustrating electrical connection of hardware components of a document management apparatus (server) and a client of the document management system.

FIG. 4 is a block diagram illustrating electrical connection of hardware components of the document management server 1 and the client 3. As illustrated in FIG. 4, the document management server 1 and the client 3 are computers, e.g., personal computers, and perform various calculations, respectively. Each of the document management server 1 and the client 3 includes a CPU 11 controlling respective parts thereof and a memory 12 constituted of ROMs and RAMs. The CPU 11 and the memory 12 are connected with each other by a bus 13.

Further, a magnetic storage device 14 such as a hard disk, an inputting device 15 constituted of a mouse, a keyboard, etc., a display device 16, and a storage medium reading device 18 for reading a storage medium 17 are connected with the bus 13 via appropriate interfaces. Furthermore, a communication interface 19 configured to communicate with the LAN 4 is connected with the bus 13. For the storage medium 17, various media may be used, e.g., an optical disk such as a CD, DVD, an optical magnetic disk, and a flexible disk, etc. For the storage medium reading apparatus 18, according to the kind of a storage medium used for the storage medium 17, an optical disk reading device, an optical magnetic reading device, and a flexible disk reading device may be used.

In the document management server 1, the document database 2 (as seen in FIG. 3) is constituted in the magnetic storage device 14. Further, a document management program is stored in the magnetic storage device 14. In the client 3, a document accessing program as an application program is stored in the magnetic storage device 14. The document management program and the document accessing program are read out by the storage medium reading device 18 from the storage medium 17 or downloaded from a network such as the Internet to be installed in the magnetic storage device 14, respectively. The document management server 1 and the client 3 are put into operable states by installing the document management program and the document accessing program, respectively.

The document management program of the document management server 1 constructs the document database 2 that manages, as described above, documents using the DMA document object model. Further, as described below, the document management program performs a process wherein the client 3 accesses the document database 2 (as seen in FIG. 3) of the document management server 1. The document accessing program of the client 3 performs a process of accessing the document management server 1 to obtain desired document data.

Hereinbelow, the process wherein the client 3 accesses the document database 2 of the document management server 1 is described.

Figure 5:
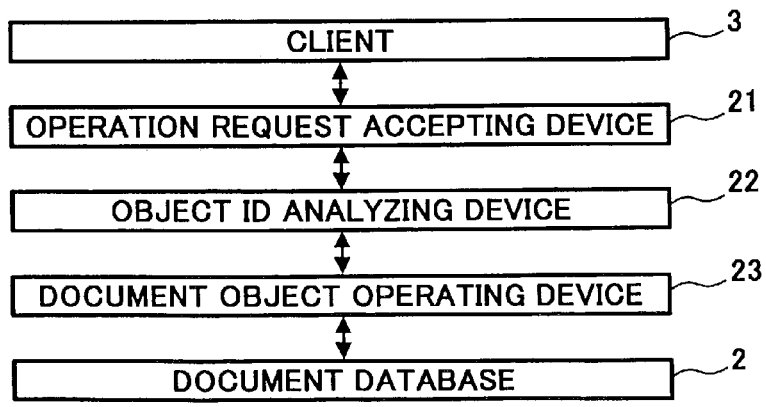
FIG. 5 is a block diagram for explaining a process when the client accesses the document management apparatus (server) according to a document management program of the document management apparatus (server)

FIG. 5 is a functional block diagram for explaining the process performed by the document management server 1 according to the document management program when the client 3 accesses the document database 2 (as seen in FIG. 3). An operation request accepting device 21 accepts an operation request from the client 3 to a document object registered in the document database 2, that is made by presenting an object ID (described below ) designating the document object. Further, the operation request accepting device 21 outputs a result of an operation for the document object according to the operation request from the client 3, and informs the client 3 of the result of the operation. An object ID analyzing device 22 separates the object ID received from the client 3 into character strings for identifying versions, renditions, and content elements. A document object operating device 23 executes operations to the document object according to the character strings obtained by the object ID analyzing device 22.

Figure 6:
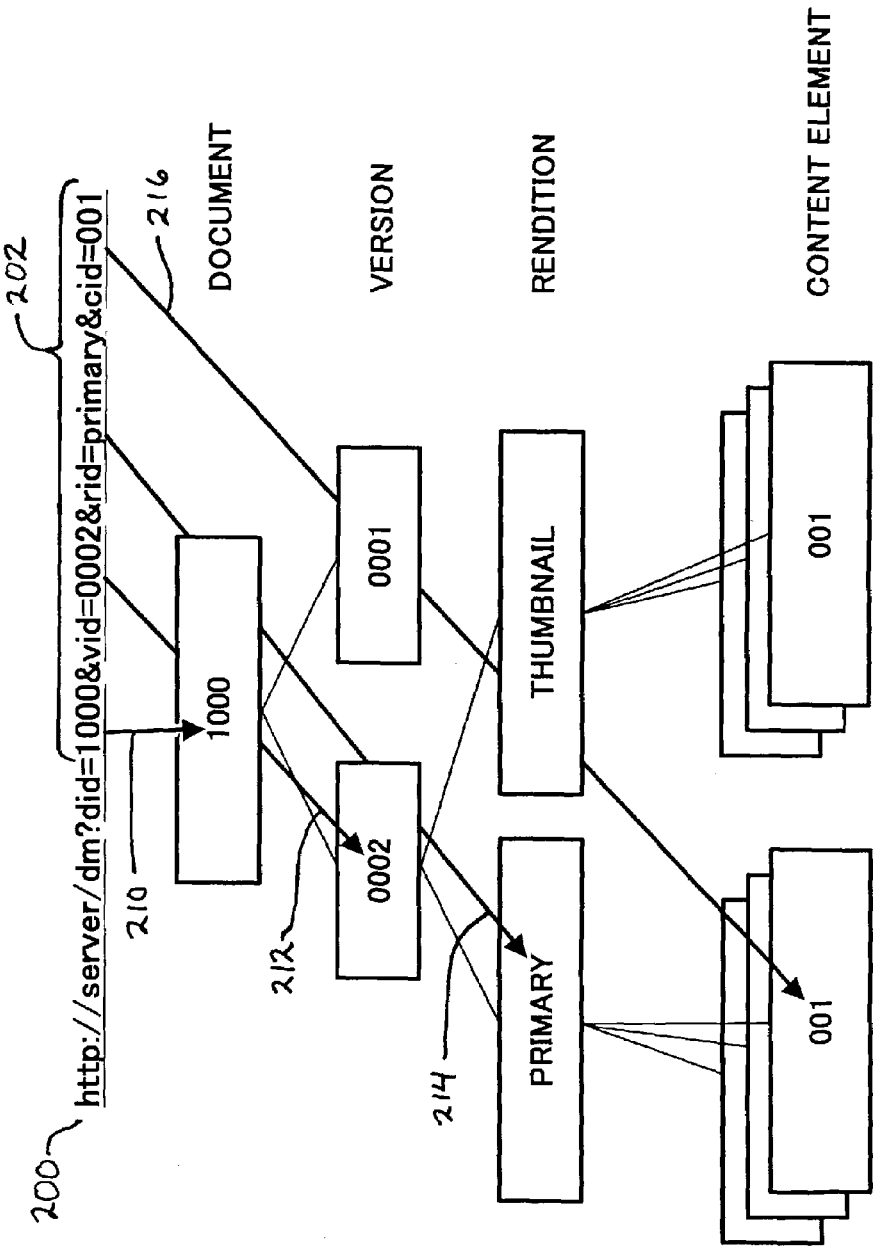
FIG. 6 is a diagram for explaining an object ID used in the document management program and a document accessing program of the client for identifying document data.

The document management program of the document management server 1 and the document accessing program of the client 3 (as seen in FIG. 3) respectively specify desired document data using the object ID. The document ID is an identifier for uniquely specifying and calling a specific node of a hierarchical tree-structure of a desired document. FIG. 6 is a diagram for explaining the object ID 200. The object ID is based on the Uniform Resource Identifier (URI), structure Request for Comment Document (RFC) 2396. As illustrated in FIG. 6, the character string connecting a URI scheme (http://), a server name (server), and a route (/dm) with each other corresponds to a document space (docspace) of the DMA specification. A location of desired document data is specified by this character string of the object ID.

Following the document space, four arguments are designated. The arguments are connected with each other by a symbol "&".

The argument "did=" describes a character string identifying a document object designated by the object ID. This argument enables accessing a desired document object. In the example of "did=1000" illustrated in FIG. 6, a document object having the value of 1000 is accessed (see arrow 210).

The argument "vid=" describes a character string identifying a specific version of the document object designated by the object ID. This argument enables accessing a specific version in the hierarchy of a document. In the example of "vid=0002" illustrated in FIG. 6 (see arrow 212), a version having the value of 0002 is accessed.

The argument "rid=" describes a character string identifying a specific rendition of the document object designated by the object ID. This argument enables accessing a specific rendition in the hierarchy of a document. In the example of "rid=primary" illustrated in FIG. 6 (see arrow 214), a rendition identified by the character string of "primary" is accessed.

The argument "cid=" describes a character string identifying a specific content element of the document object designated by the object ID. This argument enables accessing a specific content element in the hierarchy of a document. In the example of "cid=001" illustrated in FIG. 6 (see arrow 216), a content element identified by the value of 001 is accessed.

The relation of the arguments of the object ID and the hierarchy of a document is as indicated by arrows 210-216 in FIG. 6. The argument "did" points to a specific document object, the argument "vid" points to a specific version, the argument "rid" points to a specific rendition, and the argument "cid" points to a specific content element.

Next, a process that is performed at the document management server 1 after document data registered in the document database 2 has been requested by the client 3 by presenting an object ID is described.

For accessing desired document data registered in the document database 2, the client 3 presents the above-described object ID and requests transmission of the desired document data. Accordingly, a document call request making device and a document call request making process of the present invention are described.

Referring again to FIG. 5, the operation request accepting device 21 accepts this request for the desired document data from the client 3 (as shown in FIG. 3), and then the object ID analyzing device 22 analyzes the received object ID (200 of FIG. 6), and separates the object ID into character strings of arguments identifying a version, a rendition and a content element. According to the separated arguments, the document object operating device 23 specifies an objective document, and sequentially makes connections to nodes in a tree-structure of the objective document constituted of a plurality of hierarchies, which have been specified by the arguments of the object ID. That is, a connection to a version of the objective document, a connection to a rendition of the objective document, and a connection to a content element of the objective document are sequentially performed in this order. Once connection to desired content element as the desired document data is finally made, the desired content element is returned to the client 3. Thus, a document call request accepting device and a returning device of the present invention are realized by the operation request accepting device 21, and a connecting device of the present invention is realized by the document object operating device 23.

Figure 7:
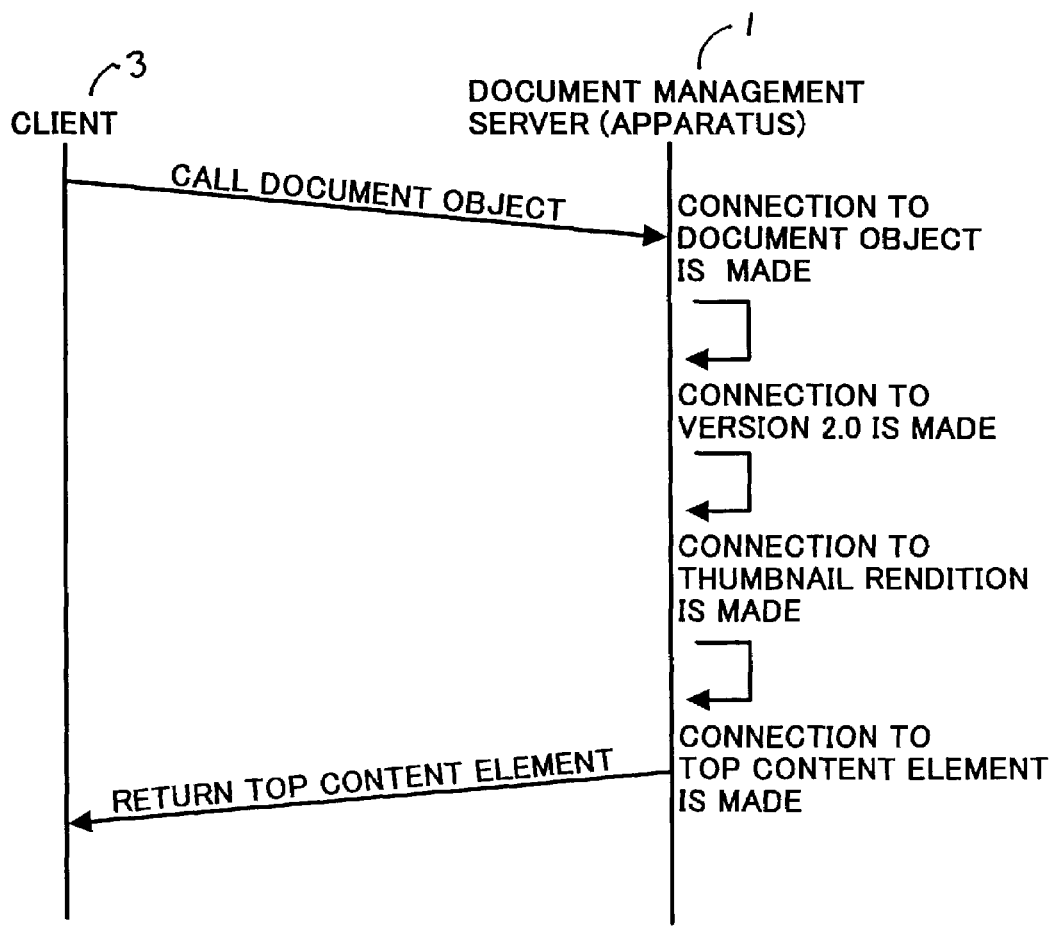
FIG. 7 is a diagram illustrating a communication sequence between the client and the document management apparatus (server) in a process when the client accesses the document management apparatus (server) to call a content element of a desired document.

FIG. 7 is a diagram illustrating a communication sequence between the client 3 and the document management server 1 in the above-described process. The communication sequence illustrated in FIG. 7 contrasts with the communication sequence illustrated in FIG. 2, which is an example of the background art. As illustrated in FIG. 7, according to the document management server 1, if the client 3 submits a request for a document to the document management server 1 once by presenting an object ID, the document management server 1 performs a connection to a version of the requested document, a connection to a rendition of the requested document and a connection to a content element of the requested document sequentially in this order, and when a connection to a desired content element is finally made, then the desired content element is returned to the client 3.

Figure 2:
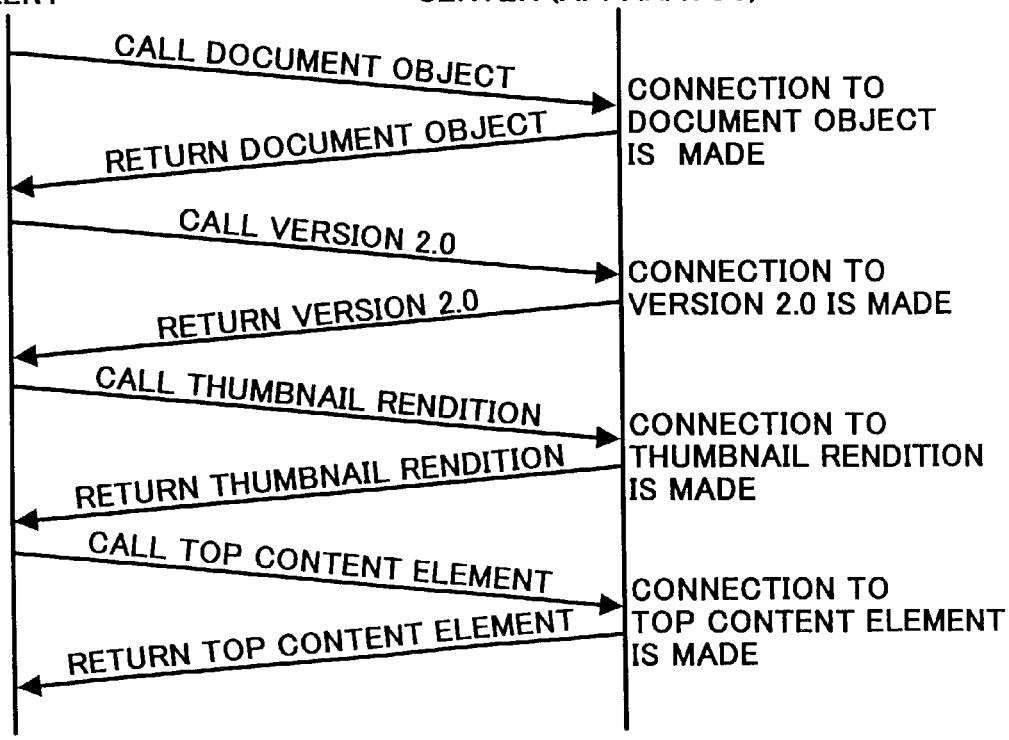
FIG. 2 is a diagram illustrating a communication sequence between a client and a document management apparatus that uses the DMA specification when the client accesses the document management apparatus to call a content element of a desired document.

Thus, unlike the example illustrated in FIG. 2, the FIG. 7 client 3 does not need to individually call a version, a rendition and a content element of a document. Further, the client 3 does not need to receive the document object, and the version and the rendition of the document. Thereby, the process of calling objective document data is simplified, and an application program for accessing the document management server 1, which is used in the client 3, can be simplified.

In the above-described example, the URI (REC2396) is used for the sentence structure of the object ID. However, other sentence structures may be also used.

Next, a process that may occur after the client 3 has been connected to an objective content element designated by the object ID is described.

According to one embodiment when the client 3 designates a specific content element by an object ID, the client 3 at the same time designates what kind of information of the objective content element is to be obtained and returned.

Figure 8:
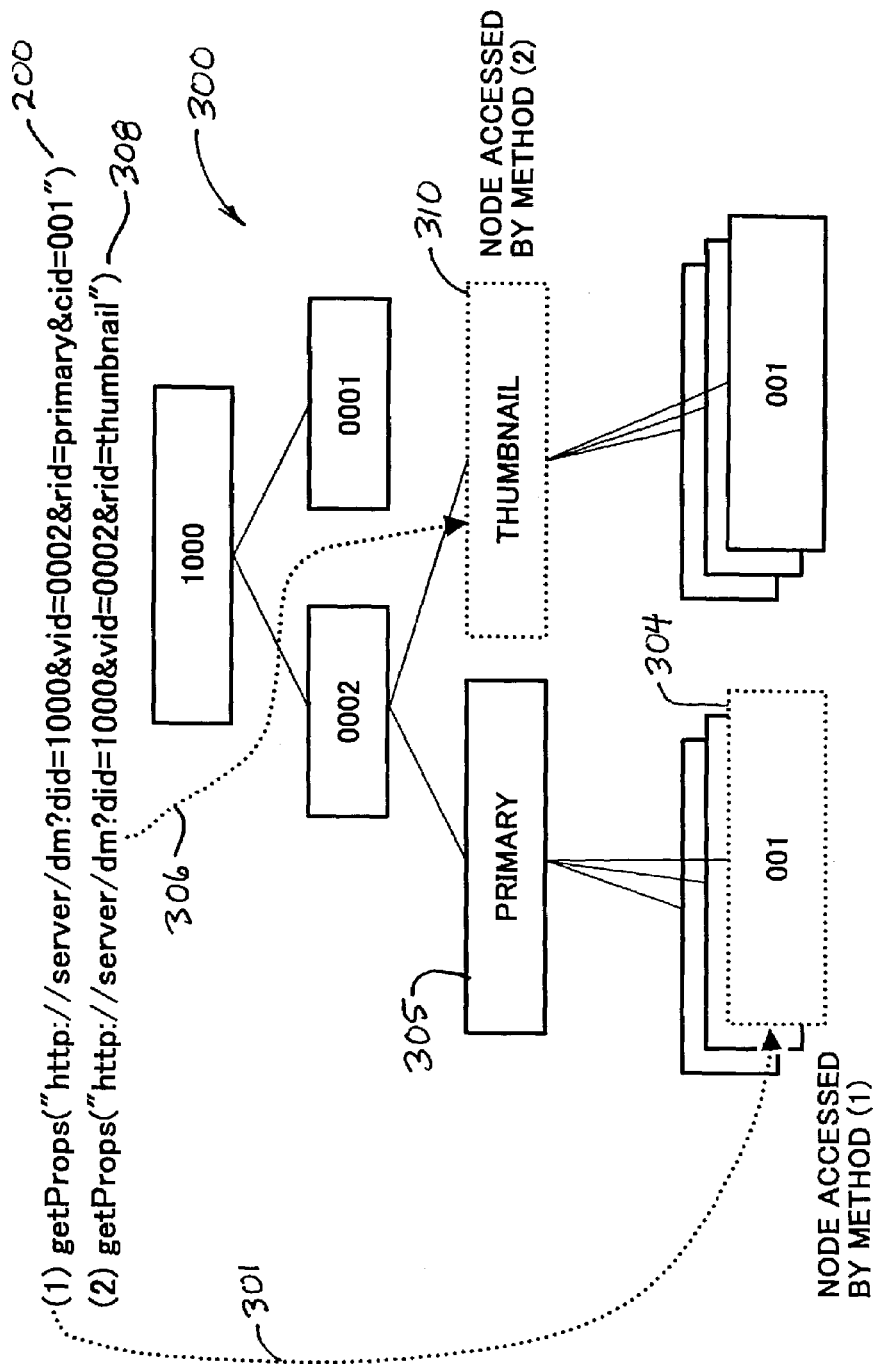
FIG. 8 is a diagram for explaining a process of obtaining a property of a specific content element using a method of "getProps"

First, a process of obtaining a property of a specific content element is described referring to FIG. 8. A method of "getProps" is used in this process. For the argument of the "getProps" method, the above-described object ID 200 (as in FIG. 6) is given. That is, the client 3 presents the method in the form of "getProps(object ID)" to the operation request accepting device 2 (as in FIG. 5).

In the exemplary "getProps" method (1) of FIG. 8, the node in the hierarchical tree-structure of a document (300), pointed to (see arrow 301) by the object ID (200), is a top content element (304) of the primary rendition (305). Accordingly, as a result of execution of the "getProps" method (1), the document object operation device 23 (as seen in FIG. 5) obtains a property of the top content element of the primary rendition, and returns the property of the top content element of the primary rendition to the client 3 (as seen in FIG. 5).

In the exemplary "getProps" method (2) of FIG. 8, the node in the hierarchical tree-structure of a document, pointed to (see arrow 306) by the object ID 308, is a thumbnail rendition 310. Accordingly, in this case, as a result of execution of the "getProps" method (2), the document object operation device 23 (as seen in FIG. 5) obtains a property of the thumbnail rendition 310, and returns the property of the thumbnail rendition 310 to the client 3 (as seen in FIG. 5).

Figure 9:
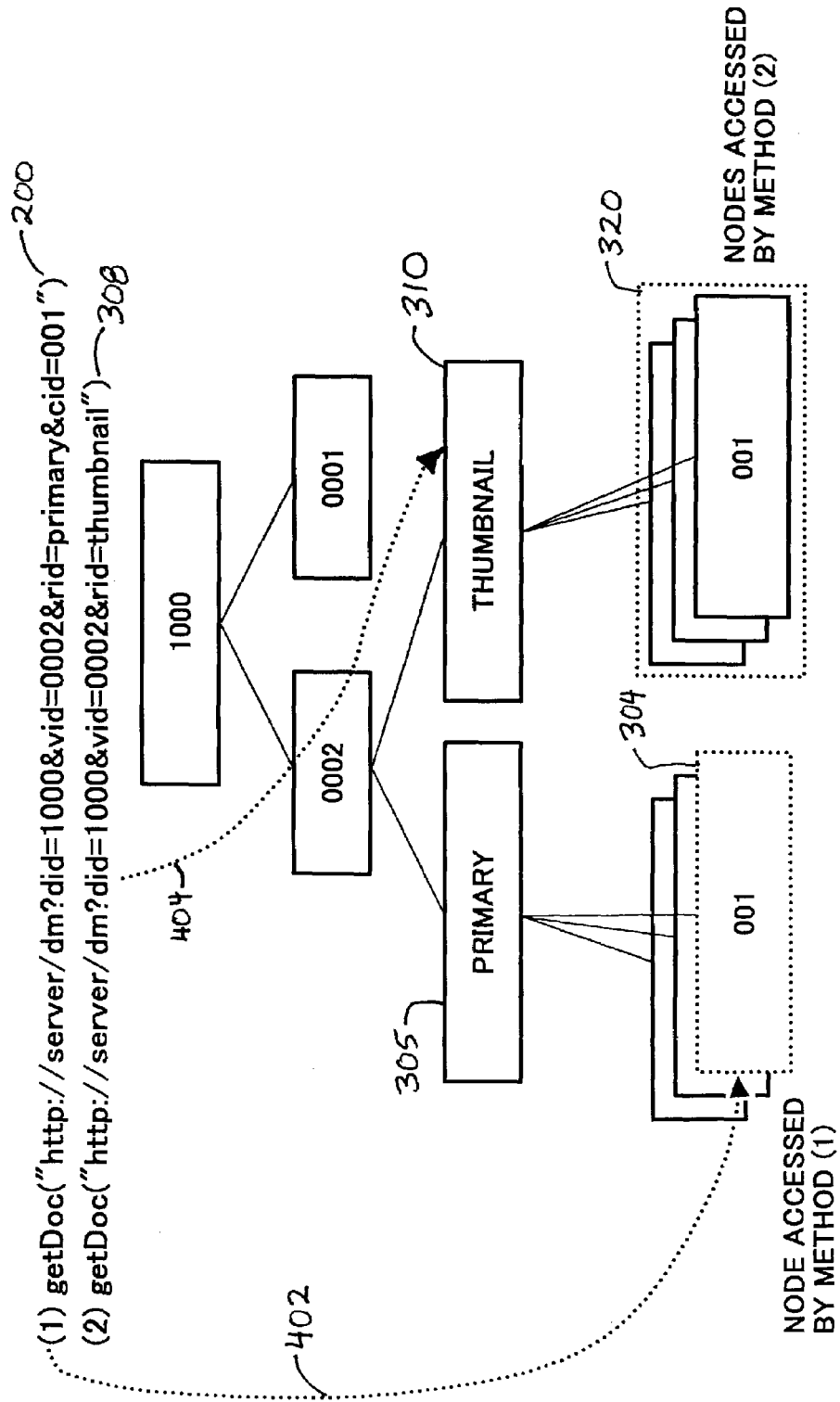
FIG. 9 is a diagram for explaining a process of obtaining a specific content element using a method of "getDoc"

FIG. 9 is a diagram for explaining a process of obtaining a specific content element. In this process, a method of "getDoc" is used. For the argument of this "getDoc" method, the above-described object ID 200 (as seen in FIG. 6) is given. That is, the client 3 (as seen in FIG. 5) presents to the operation request accepting device 2 (as seen in FIG. 5) the method in the form of "getDoc(object ID)".

As described above, the object ID uniquely specifies a specific content element in the hierarchical tree-structure of a document. The method of "getDoc" enables returning this specific content element uniquely specified by the object ID to the client 3 (as seen in FIG. 5).

In the exemplary "getDoc" method (1) of FIG. 9, the node in the hierarchical tree-structure of the document, pointed to (see arrow 402) by the object ID 200, is a top content element of the primary rendition (primary). Accordingly, as a result of execution of the "getDoc" method (1), the document object operation device 23 (as seen in FIG. 5) obtains the top content element 304 of the primary rendition 305 (primary), and returns the top content element 304 of the primary rendition 305 (primary) to the client 3 (as seen in FIG. 5).

In the exemplary "getDoc" method (2) of FIG. 9, the node in the hierarchical tree-structure of the document, pointed to (see arrow 404) by the object ID 308, is the rendition 310 (thumbnail). Accordingly, as a result of execution of the "getDoc" method (2), the document object operation device 23 (as seen in FIG. 5) obtains a series of content elements 320 (in this example, three content elements) at the lower level of the thumbnail rendition 310 (thumbnail), and returns the three content elements 320 to the client 3 (as seen in FIG. 5).

As described above with reference to FIG. 8 and FIG. 9, when performing the processes for obtaining a property of a content element and a specific content element using the "getProps" method and the "getDoc" method, respectively, the operation request accepting device 21 (as seen in FIG. 5) can receive different object IDs in the same method. Accordingly, in a plurality of systems having different document models, APIs can be standardized.

Further, in the document management system described above, according to a form of an object ID, various nodes in the hierarchical tree-structure of a document can be designated.

Figure 10:
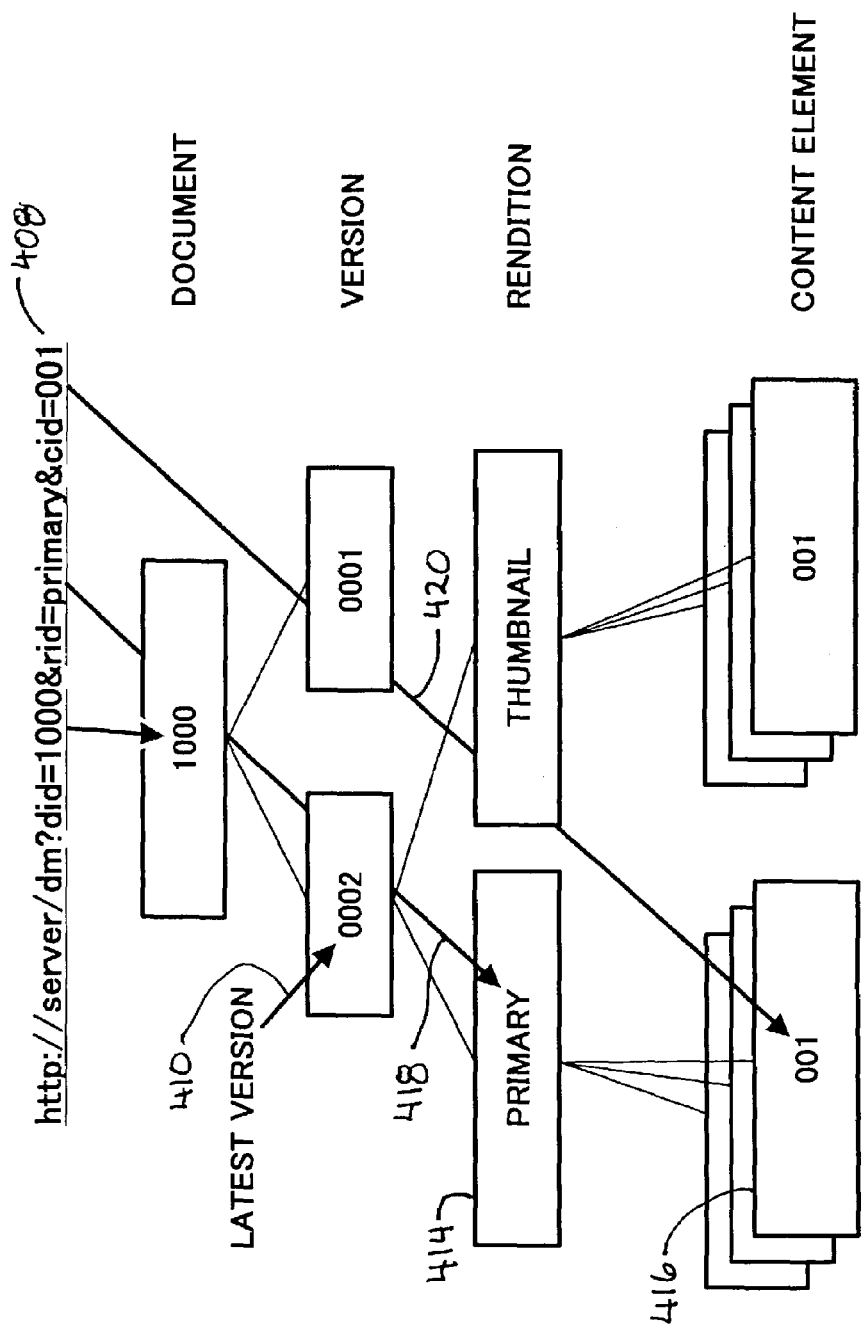
FIG. 10 is a diagram for explaining a process when designation of a version is omitted in an object ID.

For example, when designation of a version is omitted in an object ID 408 as in the example illustrated in FIG. 10, the document object operating device 23 (as seen in FIG. 5) selects the node of a latest version (see arrow 410). In this case, further, the rendition 414 and the content element 416 that have been designated by the object ID at the lower level of the latest version are sequentially designated (see arrows 418 and 420 respectively).

Figure 11:
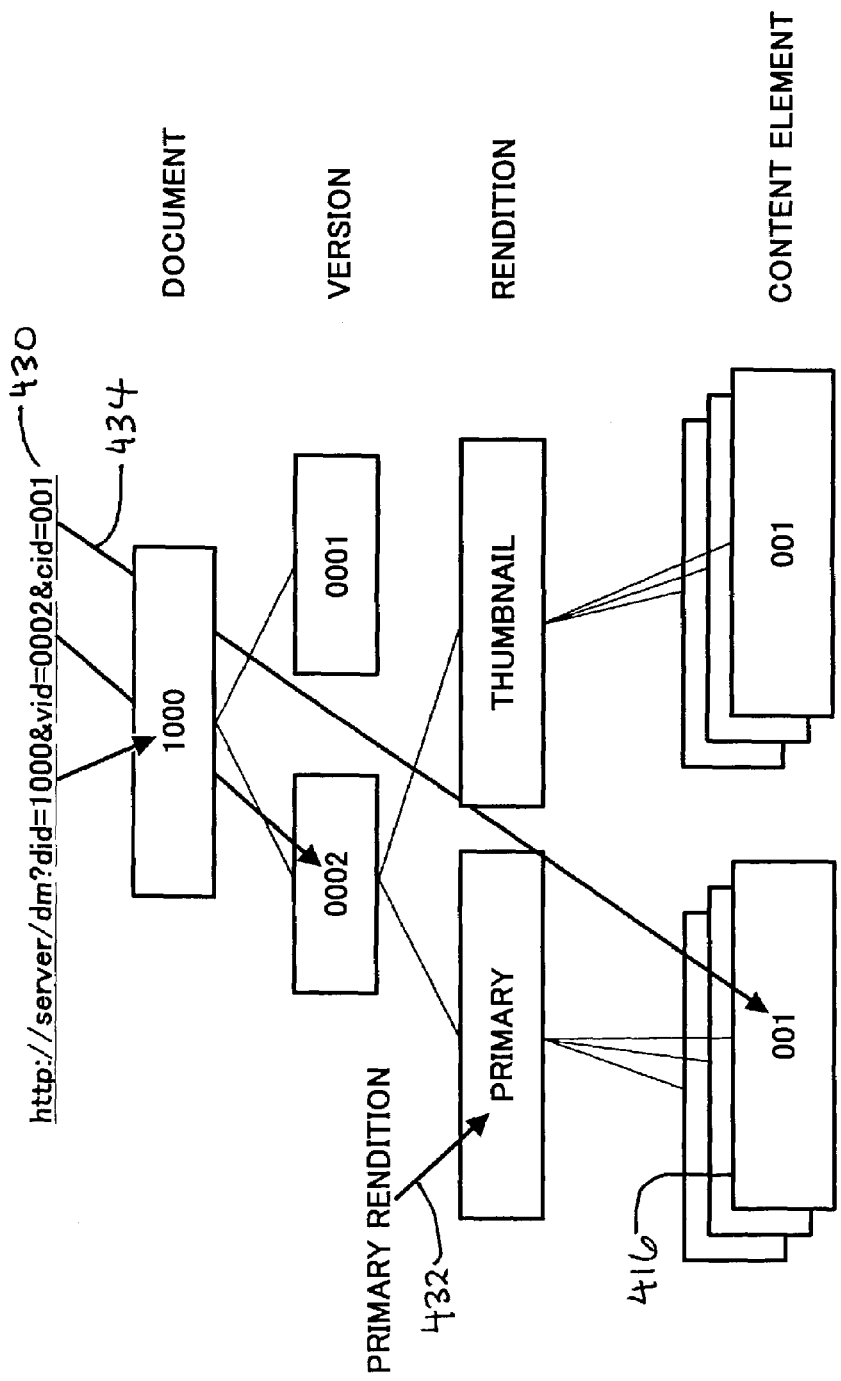
FIG. 11 is a diagram for explaining a process when designation of a rendition is omitted in an object ID.

Further, as illustrated in FIG. 11, when designation of a rendition is omitted in an object ID 430, the document object operating device 23 (as seen in FIG. 5) selects the node of a primary rendition (see arrow 432). In this case, further, a content element 416 that has been designated by the object ID at the lower level of the primary rendition is designated (see arrow 434).

Figure 12:
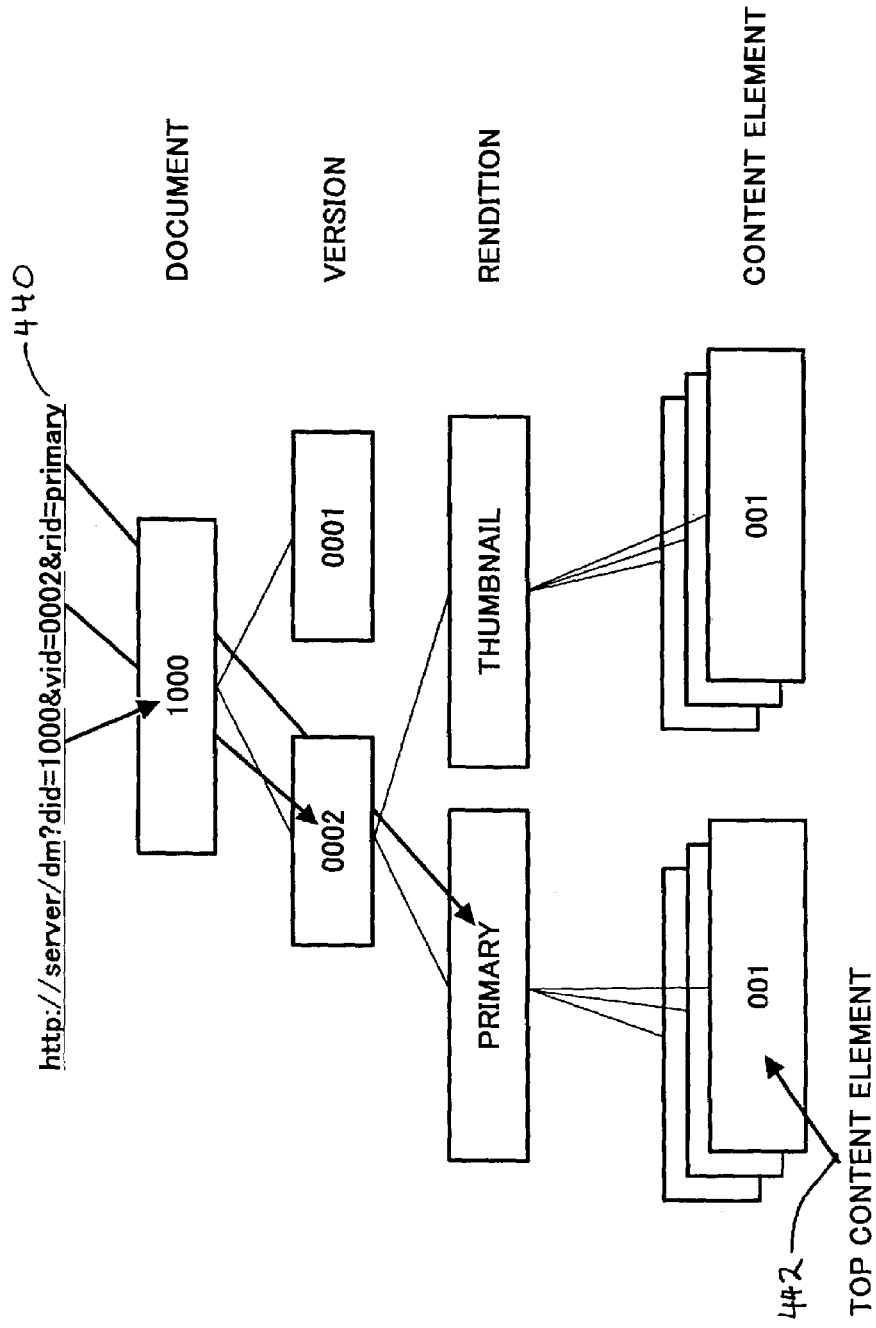
FIG. 12 is a diagram for explaining a process when designation of a content element is omitted in an object ID.

Furthermore, when designation of a content element is omitted in an object ID 440 as illustrated ion FIG. 12, the document object operating device 23 (as seen in FIG. 5) selects the node of the top content element (see arrow 442).

Thus, according the processes described above with reference to FIG. 10, FIG. 11 and FIG. 12, even when management of versions, renditions, etc. of documents is not performed at the side of the client 3, documents registered in the document database 2 can be accessed by the client 3.

The document management program of the document management server 1 may include several methods for document management, for example, in addition to the above-described methods for obtaining a property and a content element, other methods such as a method for document deletion. The processes described with reference to FIG. 6 through FIG. 12 may be appropriately combined in each of the methods. For example, for obtaining a property, the process described with reference to FIG. 8 may be used, and for obtaining a content element, the processes described with reference to FIG. 9 through FIG. 12 may be used, and for document deletion, the processes described referring to FIG. 8 and FIG. 9, in which different nodes can be designated even in the same method, may be used.

Figure 13A:
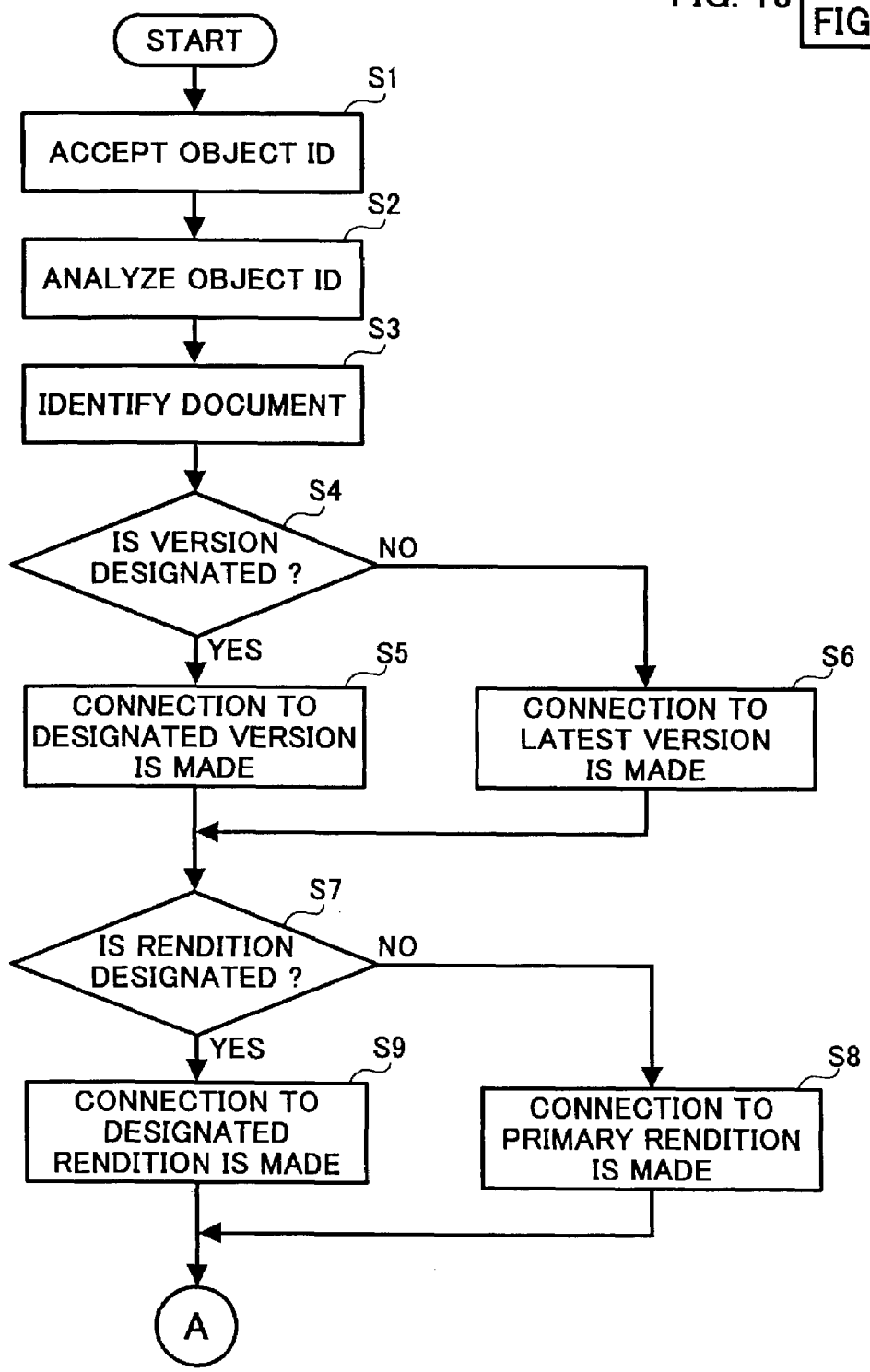
FIG. 13A and FIG. 13B are flowcharts illustrating a process described with reference to FIGS. 6-12.
Figure 13B:
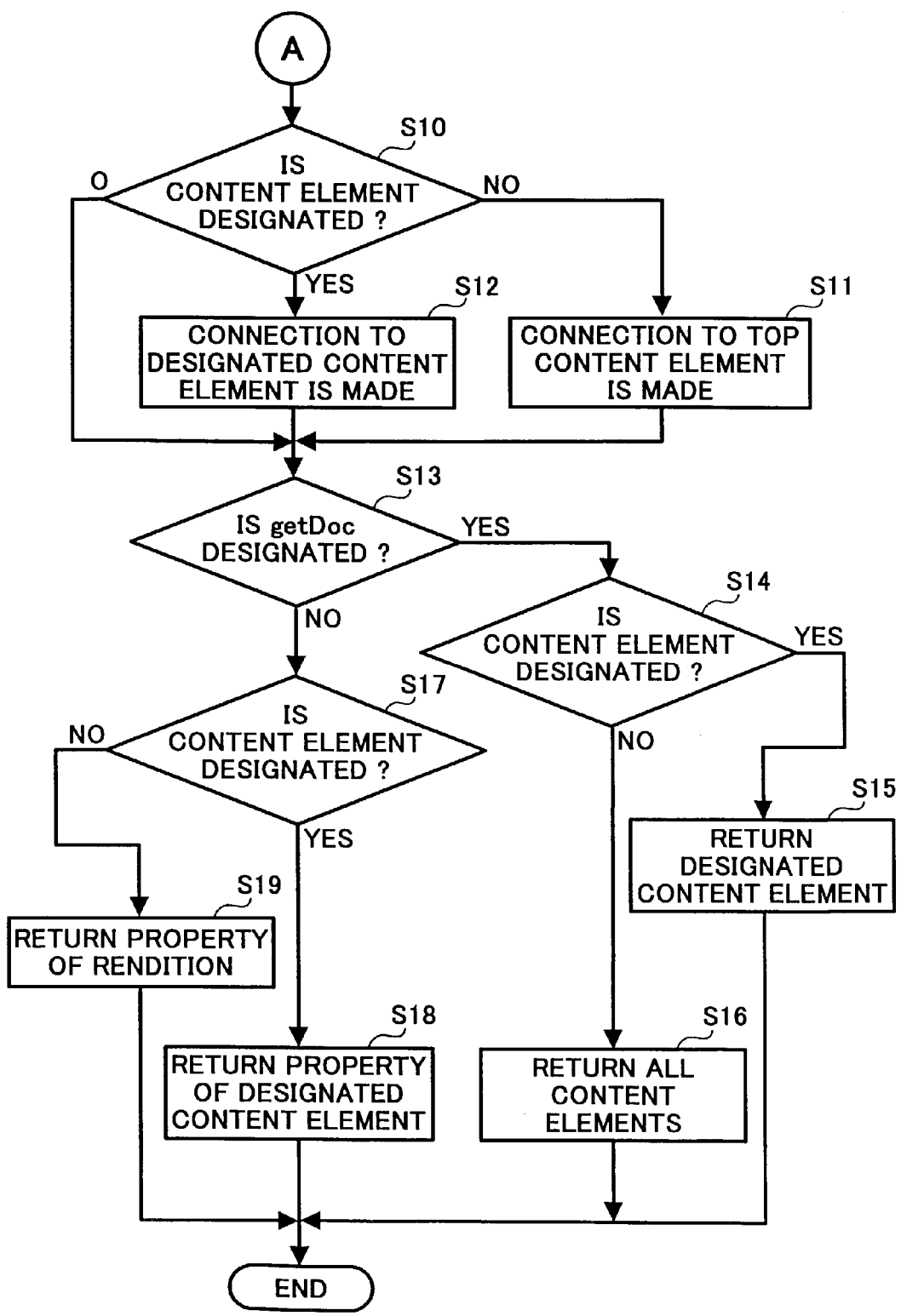

FIG. 13A and FIG. 13B illustrate a process wherein the processes described above with reference to FIG. 6 through FIG. 12 are successively performed.

The operation request accepting device 21 (as seen in FIG. 5) receives and accepts an object ID from the client 3 (step S1). Thus, a document call request accepting process of the present invention is realized by the process of the step S1. The object ID analyzing device 22 analyzes the object ID accepted in the step S1 (step S2). According to the result of analysis in the step S2, the document object operating device 23 performs the processes of step S3 and those steps that follow.

First, the document designated by the object ID is identified in the document database 2 (step S3). If a version of the document is not designated by the object ID (N in step S4), a connection to the latest version of the document is made (step S6). If a version of the document is designated by the object ID (Y in step S4), a connection to the designated version of the document is made (step S5).

If a rendition is not designated by the object ID (N in step S7), a connection to the primary rendition (primary) at the lower level of the version to which the connection has been made in the step S5 or S6 is made (step S8). If a rendition is designated by the object ID (Y in step S7), a connection to the designated rendition at the lower level of the version to which the connection has been made in the step S5 or S6 is made (step S9).

If a content element is not designated by the object ID (N in step S10), a connection to the top content element at the lower level of the rendition to which the connection has been made in the step S8 or S9 is made (step S11). If a content element is designated by the object ID (Y in step S10), the designated content element at the lower level of the rendition to which the connection has been made in the step S8 or S9 is made (step S12). When the step S10 is not performed (O in step S10), the process proceeds to step S13. Thus, connecting processes of the present invention are realized by the processes of the steps S3 through S12.

Next, a method is executed. When the "getDoc" method is designated (Y in step S13), if a content element is designated (Y in step S14), the designated content element is obtained and is returned to the client 3 (step S15). If a content element is not designated (N in step S14), all of the content elements at the lower level of the rendition to which the connection has been made in the step S8 or S9 are obtained and are returned to the client 3 (step S16).

When the "getProps" method is designated (N in step S13), if a content element is designated (Y in step S17), a property of the designated content element is obtained and is returned to the client (step S18). If a content element is not designated (N in step S17), a property of the rendition to which the connection has been made in the step S8 or S9 is obtained and is returned to the client 3 (step S19). Thus, returning processes of the present invention are realized by the processes of the steps S13 through S19.

Numerous additional modifications and variations of the present invention are possible in light of the above teachings. It is therefore to be understood that within the scope of the appended claims, the present invention may be practiced otherwise than as specifically described herein and the scope of the invention is limited only by the claims appended hereto.

What is claimed as new and is desired to be secured by Letters Patent of the United States is:

1. A document management apparatus included in a server computer designating a desired document in a series of documents managed under a Document Management Alliance document object model and making a connection to a desired node in a hierarchical tree-structure of the desired document, the document management apparatus comprising:

a document call request accepting device configured to accept a document call request made through a network for the desired document, that is made by a client computer serving as a requesting device by presenting a document ID designating the desired document and specifying the desired node, the document ID including two character strings in the form of one of a URL syntax or a sentence construction, the first character string being a route node specifying document object and the second character string designating a document node positioned lower than the route node in the hierarchical tree-structure to specify at least one of a version, a rendition, or a content of the document object;

an object ID analyzing device configured to separate said document ID into character strings for identifying at least one of said version, said rendition, or said content of the document object;

a document object operating device configured to execute operations in accordance with said character strings separated by said object ID analyzing device, said document object operating device further configured to provide a default value for at least one of said version, said rendition or said content of the document object;

a connecting device configured to make connections to nodes in the hierarchical tree-structure of the desired document, that are designated by the document ID, sequentially from an upper level one to a lower level one; and a returning device configured to return, when a connection to the desired node specified by the document ID has been made, the prescribed information related to the desired node.

2. The document management apparatus according to claim 1, wherein the document call request accepting device is configured to accept, together with the document ID, a request of a method that designates information to be returned by the returning device to the requesting device, and wherein the returning device is configured to return, when the connection to the desired node specified by the document ID has been made, the information designated by the method to be returned by the returning device to the requesting device, the information to the requesting device making the document call request.

3. The document management apparatus according to claim 2, wherein the document call request accepting device is configured to accept a request for a property of the desired node specified by the document ID, and wherein the returning device is configured to return, when the request for the property of the desired node specified by the document ID has been accepted by the document call request accepting device, the property of the desired node specified by the document ID, the property of the desired node specified by the document ID to the requesting device making the document call request.

4. The document management apparatus according to claim 2, wherein the document call request accepting device is configured to accept, as the request of the method, a request for a content element of the desired node specified by the document ID, and wherein the returning device is configured to return, when the request for the content element of the desired node specified by the document ID has been accepted by the document call request accepting device, the content element of the desired node specified by the document ID, the content element of the desired node specified by the document ID to the requesting device making the document call request.

5. The document management apparatus according to claim 4, wherein the returning device is configured to return, when the document ID accepted by the document call request accepting device omits designation of a content element in the hierarchical tree-structure of the desired document, all content elements at a lower level of a rendition designated by the document ID, all content elements at the lower level of the rendition designated by the document ID to the requesting device making the document call request.

6. The document management apparatus according to claim 1, wherein the connecting device is configured to make a connection to a latest version of the desired document designated by the document ID, when the document ID accepted by the document call request accepting device omits designation of a version in the hierarchical tree-structure of the desired document.

7. The document management apparatus according to claim 1, wherein the connecting device is configured to make a connection to a primary rendition at a lower level of a version of the desired document, that is designated by the document ID, when the document ID accepted by the document call request accepting device omits designation of a rendition in the hierarchical tree-structure of the desired document.

8. The document management apparatus according to claim 1, wherein the connecting device is configured to make a connection to a top content element at a lower level of a rendition of the desired document, that is designated by the document ID, when the document ID accepted by the document call accepting device omits designation of a content element in the hierarchical free-structure of the desired document.

9. A document management system comprising:

a document management apparatus included in a server computer configured to designate a desired document in a series of documents managed under a Document Management Alliance document object model and to make a connection to a desired node in a hierarchical tree-structure of the desired document; and a client apparatus configured to access the document management apparatus to make a document call request for the desired document by presenting a document ID including two character strings in the form of one of a URL syntax or a sentence construction, the first character string being a route node designating the document object and the second character string specifying at least one of a version, a rendition, or a content of the desired document, the document management apparatus including;

a document call request accepting device configured to accept the document call request for the desired document, that is made by the client apparatus;

an object ID analyzing device configured to separate said document ID into character strings for identifying at least one of said version, said rendition or said content of the document object;

a document object operating device configured to execute operations in accordance with said character strings separated by said object ID analyzing device, said document object operating device further configured to provide a default value for at least one of said version, said rendition or said content of the document object;

a connecting device configured to make connections to nodes in the hierarchical tree-structure of the desired document, that are designated by the document ID, sequentially from an upper level one to a lower level one; and a returning device configured to return, when a connection to the desired node specified by the document ID has been made, the prescribed information related to the desired node.

10. The document management system according to claim 9, wherein the document call request accepting device of the document management apparatus is configured to accept, together with the document ID, a request of a method that designates information to be returned by the returning device of the document management apparatus to the client apparatus making the document call request, and wherein the returning device of the document management apparatus is configured to return, when the connection to the desired node specified by the document ID has been made, the information designated by the method to be returned by the returning device to the client apparatus, the information designated by the method to the client apparatus making the document call request.

11. The document management system according to claim 10, wherein the document call accepting device is configured to accept, as the request of the method, a request for a property of the desired node specified by the document ID, and wherein the returning device is configured to return, when the request for the property of the desired node specified by the document ID has been accepted by the document call request accepting device, the property of the desired node specified by the document ID, the property of the desired node specified by the document ID to the client apparatus making the document call request.

12. The document management system according to claim 10, wherein the document call request accepting device is configured to accept, as the request of the method, a request for a content element of the desired node specified by the document ID, and wherein the returning device is configured to return, when the request for the content element of the desired node specified by the document ID has been accepted by the document call request accepting device, the content element of the desired node specified by the document ID, the content element of the desired node specified by the document ID to the client apparatus making the document call request.

13. The document management system according to claim 12, wherein the returning device is configured to return, when the document ID accepted by the document call request accepting device omits designation of a content element in the hierarchical tree-structure of the desired document, all content elements at a lower level of a rendition designated by the document ID, the all content elements at the lower level of the rendition designated by the document ID to the client apparatus making the document call request.

14. The document management system according to claim 9, wherein the connecting device of the document management apparatus is configured to make a connection to a latest version of the desired document designated by the document ID, when the document ID accepted by the document call request accepting device of the document management apparatus omits designation of a version in the hierarchical tree-structure of the desired document.

15. The document management system according to claim 9, wherein the connecting device of the document management apparatus is configured to make a connection to a primary rendition at a lower level of a version of the desired document, that is designated by the document ID, when the document ID accepted by the document call accepting device of the document management apparatus omits designation of a rendition in the hierarchical tree-structure of the desired document.

16. The document management system according to claim 9, wherein the connecting device of the document management apparatus is configured to make a connection to a top content element at a lower level of a rendition of the desired document, that is designated by the document ID, when the document ID accepted by the document call accepting device of the document management apparatus omits designation of a content element in the hierarchical tree-structure of the desired document.

17. A document management method for designating a desired document in a series of documents managed under a Document Management Alliance document object model and for making a connection to a desired node in a hierarchical tree-structure of the desired document, the method comprising the steps of:

accepting a document call request for the desired document, that is made by a client apparatus by presenting a document ID including two character strings in the form of one of a URL syntax or a sentence construction, a first character string being a route node specifying the document object and the second character string specifying a document node positioned lower than the route node in the hierarchical tree-structure to specify at least one of a version, a rendition, or a content of the document object;

separating said document ID into character strings for identifying at least one of said version, said rendition or said content of the document object;

executing operations in accordance with said character strings separated by said object ID analyzing device, said document object operating device further configured to provide a default value for at least one of said version, said rendition or said content of the document object;

making connections to nodes in the hierarchical tree-structure of the desired document, that are designated by the document ID, sequentially from an upper level one to a lower level one; and returning, when a connection to the desired node specified by the document ID has been made in the connections making step, prescribed information related to the desired node.

18. The document management method according to claim 17,
wherein in the document call request accepting step, together with the document ID, a request of a method that designates information to be returned to the client apparatus is accepted, and
wherein in the returning step, when the connection to the desired node specified by the document ID has been made in the connections making step, the information designated by the method is returned to the client apparatus making the document call request.

19. The document management method according to claim 18,
wherein in the document call request accepting step, as the request of the method, a request for a property of the desired node specified by the document ID is accepted, and
wherein in the returning step, when the request for the property of the desired node specified by the document ID has been accepted in the document call request accepting step, the property of the desired node specified by the document ID is returned to the client apparatus making the document call request.

20. The document management method according to claim 18,
wherein in the document call request accepting step, as the request of the method, a request for a content element of the desired node specified by the document ID is accepted, and
wherein in the returning step, when the request for the content element of the desired node specified by the document ID has been accepted in the document call request accepting step, the content element of the desired node specified by the document ID is returned to the client apparatus making the document call request.

21. The document management method according to claim 20,
wherein in the returning step, when the document ID accepted in the document call request accepting step omits designation of a content element in the hierarchical tree-structure of the desired document, all content elements at a lower level of a rendition designated by the document ID are returned to the client apparatus making the document call request.

22. The document management method according to claim 17,
wherein in the connections making step, a connection to a latest version of the desired document designated by the document ID is made when the document ID accepted in the document call request accepting step omits designation of a version in the hierarchical tree-structure of the desired document.

23. The document management method according to claim 17,
wherein in the connections making step, a connection to a primary rendition at a lower level of a version of the desired document, that is designated by the document ID, is made when the document ID accepted in the document call request accepting step omits designation of a rendition in the hierarchical tree-structure of the desired document.

24. The document management method according to claim 17,
wherein in the connections making step, a connection to a top content element at a lower level of a rendition of the desired document, that is designated by the document ID, is made when the document ID accepted in the document call request accepting step omits designation of a content element in the hierarchical tree-structure of the desired document.

25. A method for accessing a document management apparatus included in a server computer in which designation of a desired document in a series of documents managed under a Document Management Alliance document object model and a connection to a desired node in a hierarchical tree-structure of the desired document are made to request prescribed information relating the desired node, the method comprising the steps of:
making a document call request to the document management apparatus by presenting a document ID including two character strings in the form of one of a URL syntax or a sentence construction, the first character string being a route node designating the document object and the second character string specifying a document node positioned lower than the route node in a hierarchical tree-structure to specify at least one of a version, a rendition, or a content of the document object;
separating said document ID into character strings for identifying at least one of said version, said rendition or said content of the document object;
executing operations in accordance with said character strings separated by said separating step;
providing a default value for at least one of said version, said rendition or said content of the document object; and
storing an application program for making the document call request to the document management apparatus.

26. A computer readable medium storing computer program instructions which when executed by a computer performs a document managing operation of designating a desired document in a series of documents managed under a Document Management Alliance document object model and making a connection to a desired node in a hierarchical tree-structure of the desired document, the document managing operation comprising the steps of:
accepting a document call request for the desired document, that is made by a client apparatus by presenting a document ID including two character strings in the form of one of a URL syntax or a sentence construction, the first character string being a route node designating the document object and the second character string specifying at least one of a version, a rendition, or a content of the document object;
separating said document ID into character strings for identifying at least one of said version, said rendition or said content of the document object;
executing operations in accordance with said character strings separated by said separating step;
providing a default value for at least one of said version, said rendition or said content of the document object;
making connections to nodes in the hierarchical tree-structure of the desired document, that are designated by the document ID, sequentially from an upper level one to a lower level one; and
returning, when a connection to the desired node specified by the document ID has been made in the connections making step, the prescribed information related to the desired node.

27. The computer readable medium according to claim 26,
wherein in the document call request accepting step, together with the document ID, a request of a method that designates information to be returned to the client apparatus is accepted, and wherein in the returning step, when the connection to the desired node specified by the document ID has been made in the connections making step, the information designated by the method is returned to the client apparatus making the document call request.

28. The computer readable medium according to claim 27, wherein in the document call request accepting step, as the request of the method, a request for a property of the desired node specified by the document ID is accepted, and wherein in the returning step, when the request for the property of the desired node specified by the document ID has been accepted in the document call request accepting step, the property of the desired node specified by the document ID is returned to the client apparatus making the document call request.

29. The computer readable medium according to claim 27, wherein in the document call request accepting step, as the request of the method, a request for a content element of the desired node specified by the document ID is accepted, and wherein in the returning step, when the request for the content element of the desired node specified by the document ID has been accepted in the document call request accepting step, the content element of the desired node specified by the document ID [is obtained and] is returned to the client apparatus making the document call request.

30. The computer readable medium according to claim 29, wherein in the returning step, when the document ID accepted in the document call request accepting step omits designation of a content element in the hierarchical tree-structure of the desired document, all content elements at a lower level of a rendition designated by the document ID are obtained and are returned to the client apparatus making the document call request.

31. The computer readable medium according to claim 26, wherein in the connections making step, a connection to a latest version of the desired document designated by the document ID is made when the document ID accepted in the document call request accepting step omits designation of a version in the hierarchical tree-structure of the desired document.

32. The computer readable medium according to claim 26, wherein in the connections making step, a connection to a primary rendition at a lower level of a version of the desired document, that is designated by the document ID, is made when the document ID accepted in the document call request accepting step omits designation of a rendition in the hierarchical tree-structure of the desired document.

33. The computer readable medium according to claim 26, wherein in the connections making step, a connection to a top content element at a lower level of a rendition of the desired document, that is designated by the document ID, is made when the document ID accepted in the document call request accepting step omits designation of a content element in the hierarchical tree-structure of the desired document.

34. A computer readable medium storing computer program instructions which when executed by a computer performs an operation for accessing a document management apparatus in which designation of a desired document in a series of documents managed under a Document Management Alliance document object model and a connection to a desired node in a hierarchical tree-structure of the desired document are made to request prescribed information relating to the desired node, the accessing operation comprising the steps of:

making a document call request to the document management apparatus included in a server computer by presenting a document ID including two character strings in the form of one of a URL syntax or a sentence construction, the first character string being a route node designating the document object and the second character string specifying the at least one of a version, a rendition, or a content of the document object;

separating said document ID into character strings for identifying at least one of said version, said rendition or said content of the document object;

executing operations in accordance with said character strings separated by said separating step;

providing a default value for at least one of said version, said rendition or said content of the document object; and storing an application program for making the document call request to the document management apparatus.

35. A computer program product embodied in a computer readable medium and directly loadable into an internal memory of a computer, comprising computer program instructions which when executed by the computer performs a document managing operation of designating a desired document in a series of documents managed under a Document Management Alliance document object model and making a connection to a desired node in a hierarchical tree-structure of the desired document, the document managing operation comprising the steps of:

accepting a document call request for the desired document, that is made by a client apparatus by presenting a document ID including two character strings in the form of one of a URL syntax or a sentence construction, the first character string being a route node designating the document object and the second character string specifying at least one of a version, a rendition, or a content of the document object;

separating said document ID into character strings for identifying at least one of said version, said rendition or said content of the document object;

executing operations in accordance with said character strings separated by said separating step;

providing a default value for at least one of said version, said rendition or said content of the document object;

making connections to nodes in the hierarchical tree-structure of the desired document, that are designated by the document ID, sequentially from an upper level one to a lower level one; and returning, when a connection to the desired node specified by the document ID has been made in the connections making step, prescribed information related to the desired node.

36. The computer program product according to claim 35, wherein in the document call request accepting step, together with the document ID, a request of a method that designates information to be returned to the client apparatus is accepted, and wherein in the returning step, when the connection to the desired node specified by the document ID has been made in the connections making step, the information designated by the method is returned to the client apparatus making the document call request.

37. The computer program product according to claim 36, wherein in the document call request accepting step, as the request of the method, a request for a property of the desired node specified by the document ID is accepted, and wherein in the returning step, when the request for the property of the desired node specified by the document ID has been accepted in the document call request accepting step, the property of the desired node specified by the document ID is returned to the client apparatus making the document call request.

38. The computer program product according to claim 36, wherein in the document call request accepting step, as the request of the method, a request for a content element of the desired node specified by the document ID is accepted, and wherein in the returning step, when the request for the content element of the desired node specified by the document ID has been accepted in the document call request accepting step, the content element of the desired node specified by the document ID is returned to the client apparatus making the document call request.

39. The computer program product according to claim 38, wherein in the returning step, when the document ID accepted in the document call request accepting step omits designation of a content element in the hierarchical tree-structure of the desired document, all content elements at a lower level of a rendition designated by the document ID are obtained and are returned to the client apparatus making the document call request.

40. The computer program product according to claim 35, wherein in the connections making step, a connection to a latest version of the desired document designated by the document ID is made when the document ID accepted in the document call request accepting step omits designation of a version in the hierarchical tree-structure of the desired document.

41. The computer program product according to claim 35, wherein in the connections making step, a connection to a primary rendition at a lower level of a version of the desired document, that is designated by the document ID, is made when the document ID accepted in the document call request accepting step omits designation of a rendition in the hierarchical tree-structure of the desired document.

42. The computer program product according to claim 35, wherein in the connections making step, a connection to a top content element at a lower level of a rendition of the desired document, that is designated by the document ID, is made when the document ID accepted in the document call request accepting step omits designation of a content element in the hierarchical tree-structure of the desired document.

43. A computer program product embodied in a computer readable medium and directly loadable into an internal memory of a computer, comprising computer program instructions which when executed by the computer performs an operation of accessing a document management apparatus in which designation of a desired document in a series of documents managed under a Document Management Alliance document object model and a connection to a desired node in a hierarchical tree-structure of the desired document are made to request prescribe information relating the desired node, the accessing operation comprising the steps of:

making a document call request to the document management apparatus by presenting a document ID including two character strings in the form of one of a URL syntax or a sentence construction, the first character string being a route node designating the document object and the second character string specifying at least one of a version, a rendition, or a content of the document object;

separating said document ID into character strings for identifying at least one of said version, said rendition or said content of the document object;

executing operations in accordance with said character strings separated by said separating step;

providing a default value for at least one of said version, said rendition or said content of the document object; and storing an application program for making the document call request to the document management apparatus.

44. A method of retrieving a document in a document management system managed under a Document Management Alliance document object model, said method being embodied in a computer readable medium which when executed by a processing apparatus comprises:

receiving a document request comprising a document ID including two character strings, the first character string being a route node and the second character string specifying at least one of a version, a rendition, or a content of a document object at a server, said document request including a plurality of hierarchical-tree parameters;

separating said document ID into character strings for identifying at least one of said version, said rendition or said content of the document object;

executing operations in accordance with said character strings separated by said separating step;

providing a default value for at least one of said version, said rendition or said content of the document object;

identifying at least one node of said document based on the first character string;

identifying a document object using said second character string; and returning, at least, a portion of said document corresponding to said at least one node.

45. A method of retrieving a document in a document management system as defined in claim 44, wherein said plurality of hierarchical-tree parameters comprises:
a document identification parameter.

46. A method of retrieving a document in a document management system as defined in claim 44, wherein said plurality of hierarchical-tree parameters comprises:
a version identification parameter.

47. A method of retrieving a document in a document management system as defined in claim 44, wherein said plurality of hierarchical-tree parameters comprises:
a rendition identification parameter.

48. A method of retrieving a document in a document management system as defined in claim 44, wherein said plurality of hierarchical-tree parameters comprises:
a content element identification parameter.

49. A method of retrieving a document in a document management system as defined in claim 44, wherein said identifying at least one node comprises:
providing a default value for said node.

50. A document management system managed under a Document Management Alliance document object model, said document management system comprising:

a server, said server being adapted to receive a document request, said document request including a document ID including two character strings, the first character string being a route node specifying a document object and the second character string identifying at least one of a version, rendition, or a content of the document object, said server being adapted to separate said document ID into character strings for identifying at least one of said version, said rendition or said content of the document object; said server being adapted to execute operations in accordance with said character strings, said server being adapted to provide a default value for at least one of said version, said rendition or said content of the document object; said server being further adapted to identify at least one node of said document request based on said document ID, said server being further adapted to return at least a portion of said document corresponding to said at least one node.

51. A document management system as defined in claim 50 wherein said server comprises a computer coupled to a communication system.

52. A document management system as defined in claim 50 wherein said document ID comprises:
   a document identification parameter.

53. A document management system as defined in claim 50 wherein said document ID comprises:
   a version identification parameter.

54. A document management system as defined in claim 50 wherein said document ID comprises:
   a rendition identification parameter.

55. A document management system as defined in claim 50 wherein said document ID comprises:
   a content element identification parameter.

* * * * *